United States Patent

Ogawa et al.

[11] Patent Number: 6,066,391
[45] Date of Patent: May 23, 2000

[54] THREE-DIMENSIONALLY PRINTED CLOTH MOLDING AND METHOD

[75] Inventors: Taro Ogawa; Fumio Goto, both of Kurashiki, Japan

[73] Assignee: Namba Press Works Co., Ltd., Kurashiki, Japan

[21] Appl. No.: 08/817,190

[22] PCT Filed: Jul. 5, 1996

[86] PCT No.: PCT/JP96/01880

§ 371 Date: Mar. 21, 1997

§ 102(e) Date: Mar. 21, 1997

[87] PCT Pub. No.: WO97/04161

PCT Pub. Date: Feb. 6, 1997

[30] Foreign Application Priority Data

Jul. 24, 1995  [JP]  Japan ................................. 7-208371

[51] Int. Cl.[7] .................................................. B32B 3/26
[52] U.S. Cl. .................................. 428/304.4; 428/314.2; 428/318.4; 264/46.5; 264/257; 264/321
[58] Field of Search ............................. 428/314.2, 304.4, 428/314.4, 423.1, 318.4, 195, 266, 284, 304.5; 264/46.5, 46.6, 257, 321

[56] References Cited

FOREIGN PATENT DOCUMENTS

2 282 335  3/1976  France .............................. B32B 3/06
23 40 594  2/1974  Germany .......................... B44C 1/00

*Primary Examiner*—Merrick Dixon
*Attorney, Agent, or Firm*—Renner, Kenner, Greive, Bobak, Taylor & Weber

[57] ABSTRACT

According to the present invention, a three-dimensional cloth molding which has superior feel and durability, and a method for three-dimensionally molding cloth which offers low production cost and high productivity are provided. Cloth layer 85 having a print pattern, foam 87, and fabric 88 having one surface on which a plastic film is laminated are locationally placed on an elastic sheet 86. While foam 87 is still in a viscoelastic fluid state, cloth 85, foam 87, fabric 88, and elastic sheet 86 are integrally pressurizingly compressed for a predetermined time duration by upper metal mold 80 and lower metal mold 82. Thereby, foam 87 is fixedly adhered to the back surface of cloth 85 to support a print pattern of the cloth, and is three-dimensionally molded so as to conform to the profile of the print pattern. The plastic film of fabric 88 is almost fixedly adhered to the surface of foam body 87, but only the peripheral edge portion of the fabric 88 is thermally adhered by additionally heating to the back surface of the cloth. As a result, foam body 87 is completely sealed between the cloth and the fabric.

23 Claims, 8 Drawing Sheets

THREE-DIMENSIONALLY PRINTED CLOTH MOLDING AND METHOD

FIELD OF TECHNOLOGY

The present invention relates generally to a method for forming a three-dimensional print on the surface of cloth made of various textures so as to conform to the shape of a printed pattern; more particularly, the present invention relates to a method for three-dimensionally forming prints or marks of various characters applied to various types of shirts, jeans, and jackets.

BACKGROUND ART

With respect to prior art of a method for three-dimensionally shaping the cloth, for example, U.S. Pat. No. 5,296,182 or U.S. Pat. No. 5,389,318 disclose the method for integrally shaping the cloth using reaction process of liquid foaming mixtures such as polyurethane foam. The method is comprised of pressurizingly integrally molding the polyurethane foam and the cloth by means of an upper metal mold and lower metal mold which have a desired three-dimensional configuration between when gasification reactions of the liquid foaming mixture has finished until the mixture substantially solidifies. As the foam completely goes into the solid state by being left in situ for a while, a three-dimensionally printed cloth of final desired pattern is finished. This conventional method for three-dimensionally molding the cloth has been widely applied to handbags or apparel items such as shirts, jeans, or jackets.

But these conventional methods have some drawbacks.

One of these disadvantages is that if a three-dimensional print is put onto the cloth such as a shirt by the conventional method, the foam body which is adhered to the back surface of the cloth directly contacts with user's skin, so that it causes a very uncomfortable feel to the user. Another disadvantage of the conventional method is that since the foam portion of the shirt molded by the conventional method is exposed to outside air, the surface of the foam body is quickly degraded by repeated laundering or by the ultraviolet rays from the sun.

Even if the back surface of the foam body portion is covered with fiber materials as described in the above references, such fiber materials are not enough to prevent sweat or rain from freely penetrating into the foam, so that the cloth discolors or the foam body portion gets heavier because of absorbing moisture.

Further, since the method of the above reference, wherein a liquid foaming mixture is deposited directly onto a non-adhesive polyethylene film, then they are integrally molded, and thereafter the polyethylene film is peeled away, uses polyethylene film which has poor expansion-and-contraction properties, it is necessary to replace the polyethylene film each time, which results in lower working efficiency and greater production cost.

It is, therefore, a object of the present invention to provide a three-dimensionally printed cloth molding and method that prevents the foam body from directly contacting with user's skin, that does not detract from the feel, and that keeps sweat or moisture from being absorbed by the foam body.

It is another object of the present invention to provide a three-dimensionally printed cloth molding and method that prevents the surface of the foam body from being degraded by repeated laundering or by the ultraviolet rays from the sun, thereby to improve its normal durability.

It is still another object of the present invention to provide a three-dimensionally printed cloth molding and method that reduces production costs and improves throughput.

DISCLOSURE OF THE INVENTION

These and other objects of the invention, which will be apparent in view of the following detailed specification, are accomplished by means hereinafter described and claimed.

One aspect of the invention of three-dimensional cloth molding shaped by integrally pressurizingly compressing a cloth and foam comprises:

a cloth layer having a print pattern on the surface, and molded three-dimensionally so as to conform to the profile shape of said print pattern;

a foam body layer which is fixedly adhered to the entire back surface region of the print pattern of said cloth layer and supports the three-dimensional shape of said print pattern; and, a fabric layer having one surface on which a plastic film is laminated, wherein after integral pressurizing compression is implemented, only the peripheral edge of said fabric layer is thermally adhered to the cloth in the periphery region around the back surface of said foam body so as to cover substantially the entire back surface of said foam body layer.

Another aspect of three-dimensional cloth molding shaped by integrally pressurizingly compressing a cloth, foam and fabric comprises:

a cloth layer having a print pattern on the front surface, and molded three-dimensionally so as to conform to the profile shape of said print pattern;

a foam body layer which is fixedly adhered to the entire back surface region of the print pattern of said cloth layer and supports the three-dimensional shape of said print pattern; and, a fabric layer having one surface on which a plastic film is laminated, wherein at the back surface region of said foam body the plastic film side of said fabric layer is fixedly adhered to the entire back surface of the foam body so as to conform to the profile shape of the back surface of said foam body, at the peripheral region of said foam body the plastic film side of the peripheral edge region of said fabric layer is thermally adhered to the cloth of the peripheral edge region around the back surface of said foam body layer.

In aforementioned three-dimensional cloth molding, said foam body is preferably made of a polyurethane or polyurea foam.

In aforementioned three-dimensional cloth molding, said fabric layer may consist of either woven fabric, knitted fabric, or nonwoven fabric.

In aforementioned three-dimensional cloth molding, said plastic film may be made from nylon, polyester, or polypropylene each consisting of moisture-nonpermeable thermoplastic resins, and is 10 μm to 1 mm thick.

On the other hand, one aspect of the method for three-dimensionally molding a printed cloth corresponding to a print pattern of the cloth surface, comprises the steps of:

placing a fabric layer having one surface on which a plastic film is laminated onto a flat elastic sheet with said plastic film surface upward;

depositing liquid foaming mixture onto said fabric layer so as to conform to desired profile;

opposing a back surface of said printed cloth to said fabric layer so that the print pattern profile of the cloth conforms to the profile of the liquid foaming mixture;

integrally pressurizingly compressing said printed cloth, the foam, the fabric layer, and the elastic sheet by means of both an upper metal mold whose inner surface corresponds to the shape of three-dimensional surface of the print pattern and a lower metal mold whose inner surface corresponds to the shape of the three-dimensional back surface of the print pattern, when predetermined time duration is past after the foam is deposited while the foam being still under viscoelastic fluid state; and, holding integral compression for a while to allow the foam to transit to solid state and fixedly adhering the plastic film side of the fabric layer to the back surface of the foam.

Another aspect of method for three-dimensionally molding a printed cloth corresponding to a print pattern of the cloth surface, comprises the steps of:

depositing liquid foaming mixture onto a flat elastic sheet so as to conform to desired profile;

opposing a back surface of said printed cloth to said flat elastic sheet so that the print pattern profile of the cloth conforms to the profile of the liquid foaming mixture;

integrally pressurizingly compressing said printed cloth, the foam, and the elastic sheet by means of both an upper metal mold whose inner surface corresponds to the shape of three-dimensional surface of the print pattern and a lower metal mold whose inner surface corresponds to the shape of the three-dimensional back surface of the print pattern, when a predetermined time duration is past after the foam is deposited while the foam is still in a viscoelastic fluid state;

transiting the foam to solid state as retaining desired shape which is formed by both said upper metal mold and said lower metal mold by holding integral compression for predetermined time duration; and, thermally adhering the peripheral edge of the fabric having one surface on which a plastic film is laminated to the cloth of the peripheral region around back surface of said foam body so that said fabric substantially cover the entire back surface of said foam body.

In aforementioned method for three-dimensionally molding a printed cloth, said elastic sheet may be made of natural rubber or silicone rubber.

In aforementioned method for three-dimensionally molding a printed cloth, liquid foaming mixture of said foam is deposited in the desired shape by means of a dispensing system or a spraying system.

In aforementioned method for three-dimensionally molding a printed cloth, the method may comprise the further step of:

preheating raw materials of said liquid foaming mixture to the range of 60 to 80° C. before it is deposited.

In aforementioned method for three-dimensionally molding a printed cloth, at the step of integrally pressurizingly compressing, the predetermined time duration between deposition of said liquid foaming mixture and pressurizing compression may be 30 to 50 seconds.

In aforementioned method for three-dimensionally molding a printed cloth, the predetermined time duration for holding the integral compression may be 30 seconds to 3 minutes.

In aforementioned method for three-dimensionally molding a printed cloth, the method may comprise the further step of:

thermally adhering the peripheral edge of the fabric having one surface on which a plastic film is laminated to the cloth of peripheral edge region around the back surface of said foam body.

BRIEF DESCRIPTION OF THE DRAWINGS

FIG. 2A is a cross-sectional view and

FIG. 3A is a cross-sectional view and

FIG. 4 is a top plan view and

FIG. 6 is a top plan view and

FIG. 8 is a top plan view and

FIG. 10 is a top plan view and

BEST MODE FOR CARRYING OUT THE INVENTION

The present invention is described below with reference to the drawings.

Figure 1:
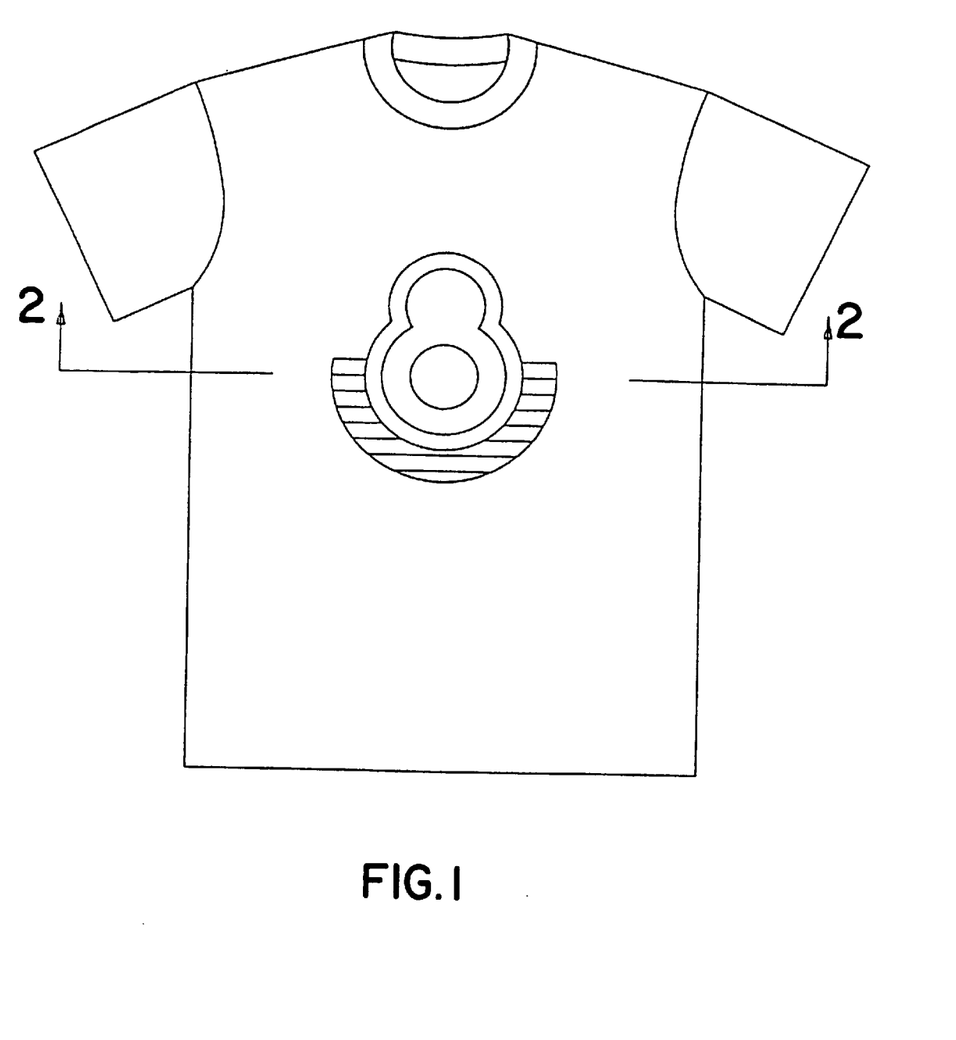
FIG. 1 is a top plan view of a shirt having a three-dimensional print according to the present invention.

FIG. 1 shows a T-shirt in which is embodied a three-dimensional print according to the present invention. The A—A cross-sectional view is shown in FIGS. 2A and 3A.

Figure 2A:
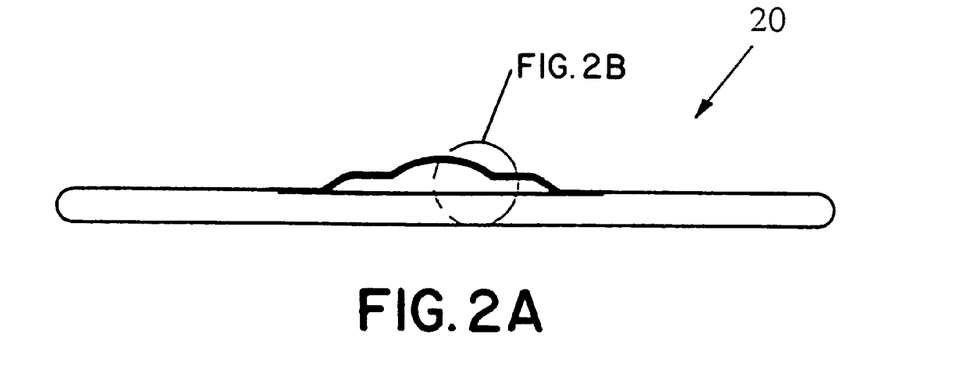
Figure 2B:
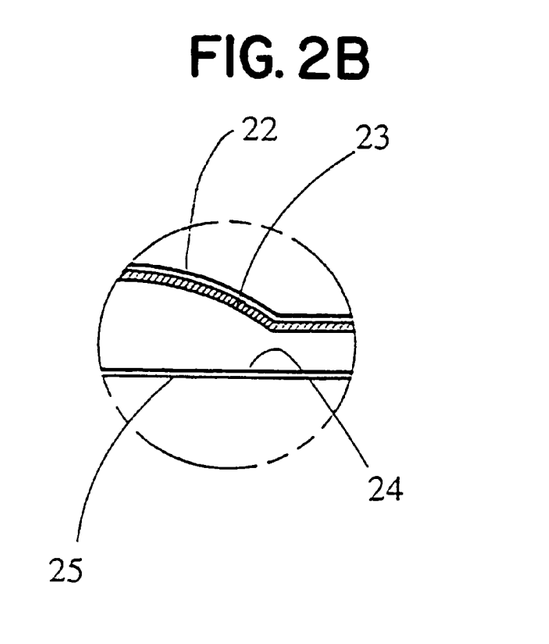
FIG. 2B is a partially enlarged view of the first embodiment of a three-dimensionally printed cloth molding according to the present invention.

FIG. 2A is cross-sectional view of the first embodiment of the three-dimensionally printed cloth molding according to the present invention, and FIG. 2B is a partially enlarged view of FIG. 2A. Three-dimensionally printed cloth molding 20 according to the present invention comprises, cloth layer 22 having a print pattern on its surface which is three-dimensionally molded so as to conform to a profile of the print pattern, foam layer 23 which is molded integrally with the cloth layer 22 to support the three-dimensional profile of the print pattern, and fabric layer 25 having one surface on which a plastic film 24 is laminated. Foam layer 23 is made of solidified polyurethane or foaming resin of polyurea-foam, which is pressure molded by a method that will be hereinafter described in detail. The thickness of the foam layer 23 is determined by clearance between the upper metal mold and the lower metal mold, preferably, it is about 1 mm. Plastic film 24 is made of a thermoplastic material, such as nylon or polyester, that is not permeable to moisture and 10 $\mu$m to 1 mm (preferably 50 $\mu$m) thick. Fabric layer 25 is made of a fiber material such as woven fabric, knitted fabric, or nonwoven fabric, and has a circumference that is radially larger than that of the print of the cloth by about 20 mm to 30 mm. Fabric layer 25 is arranged so as to substantially cover the entire back surface of foam layer 23. Preferably, fabric layer 25 is fixed to the cloth by holding the peripheral region which is inward by 10 mm to 20 mm from the edge of the fabric and heating up to about 200° C. for about 20 seconds, in order to thermally adhere the plastic film which is laminated on the fabric to the cloth of the peripheral region around the back surface of the foam body. The fabric layer 25 may also be fixed by an adhesive.

Figure 3A:
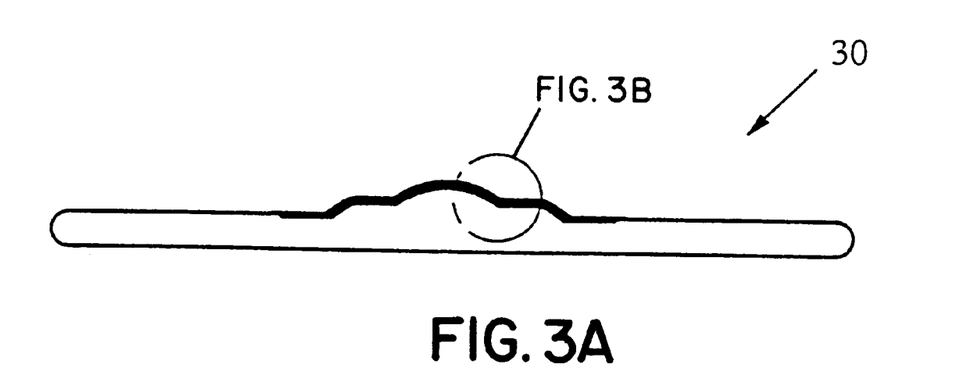
Figure 3B:
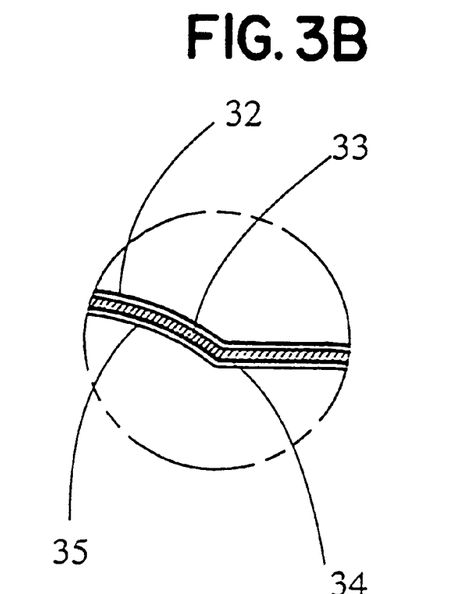
FIG. 3B is a partially enlarged view of the second embodiment of a three-dimensionally printed cloth molding according to the present invention.

FIG. 3A is a cross-sectional view of the second embodiment of a three-dimensionally printed cloth molding according to the present invention, and FIG. 3B is a partially enlarged view of FIG. 3A. Three-dimensionally printed cloth molding 30 according to the present invention comprises, cloth layer 32 having a print pattern on the surface and molded three-dimensionally so as to conform to a profile of the print pattern, foam body layer 33 which is fixedly adhered to the back surface region of the print pattern of the cloth and supports the three-dimensional shape of the print pattern, and fabric layer 35 having one surface on which a plastic film 34 is laminated. The raw material and size of each of the elements are the same as those of embodiment 1. A different point from embodiment 1 is that fabric layer 35 having one surface on which a plastic film 34 is laminated is fixedly adhered over back surface of the foam body so as to substantially cover the entire back surface of foam layer 33 to conform to the profile of the print pattern. In addition, the peripheral region of fabric layer 35 is thermally adhered to the cloth of the peripheral region around the back surface of the foam body similar to fabric layer 25 described by FIG. 2. The fabric layer 35 is integrally shaped with the cloth and foam by the method according to the present invention which will be hereinafter described in detail.

The method for three-dimensionally molding a printed cloth according to the invention is described. FIGS. 4 through 8 indicate the equipment and arrangement for shaping the three-dimensionally printed cloth according to the present invention. The first method according to the invention for three-dimensionally molding printed cloth comprises the steps of, placing a fabric layer having one surface on which a plastic film is laminated onto a flat elastic sheet with the plastic film surface upward, depositing a liquid foaming mixture onto the fabric layer so as to conform to a desired profile, opposing a back surface of printed cloth to the fabric layer so that the print pattern profile of the cloth conforms to the profile of the liquid foaming mixture, integrally pressurizingly compressing the printed cloth, the foam, the fabric layer, and the elastic sheet by means of both an upper metal mold whose inner surface corresponds to the shape of three-dimensional surface of the print pattern and a lower metal mold whose inner surface corresponds to the shape of the three-dimensional back surface of the print pattern when predetermined time duration is past after the foam is deposited, while the foam being still under viscoelastic fluid state, and holding integral compression for a while to allow the foam to transit to solid state and fixedly adhering the plastic film side of the fabric layer to the back surface of the foam.

Figure 4:
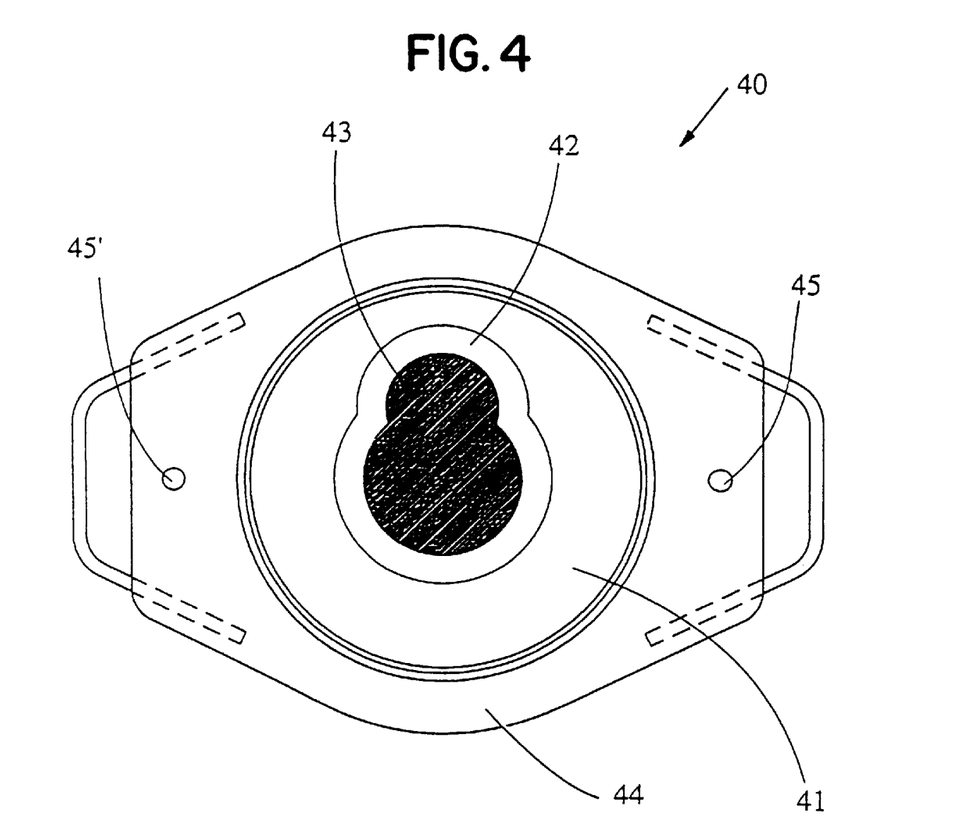
Figure 5:
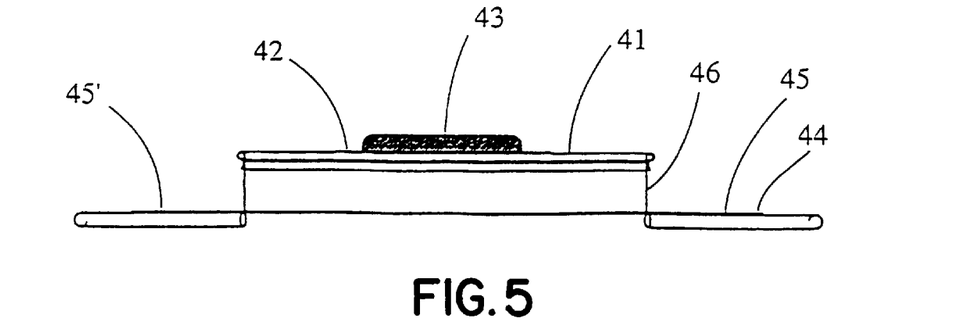
FIG. 5 is a side view of a foam depositing jig used in the method for the three-dimensionally molding of a printed cloth according to the present invention.

FIGS. 4A and 5 are respectively the top and side view of the foam depositing jig used in the first step of placing a fabric layer having one surface on which a plastic film is laminated onto a flat elastic sheet with the plastic film surface upward, and in the second step of depositing a liquid foaming mixture onto the fabric layer so as to conform to a desired profile. The foam depositing jig 40 comprises a cylindrical portion 46 and a flange portion 44 which extends outwardly from one open end of the cylindrical portion. Flange portion 44 has at least two reference holes 45, 45' such that at least two reference pins 83, 83' provided on lower metal mold 82 shown in FIG. 12 engage into the reference holes 45, 45' thereby the foam depositing jig 40 is fixed. On the upper end surface of cylindrical portion 46 of the foam depositing jig 40, elastic sheet 41 which is a one of the features of the method according to the present invention is stretched with uniform tension. The elastic sheet 41 is made from materials which have useful characteristics with respect to expansion and contraction ability, restorability, and peelability of the foam. Preferably, the elastic sheet 41 is silicone rubber with 0.5 mm thickness. It may be comprised of natural rubber or other synthetic rubber.

FIGS. 5(A) and (B) are respectively the top and side view of the masking jig used in the second step of depositing a liquid foaming mixture onto the fabric layer so as to conform to a desired profile. The masking jig 50 comprises a masking board 51, which consists of an approximately 2-mm-thick disk made from polyethylene resin having useful foam separability from the metal mold, and a flange portion 53. At the center of the masking board 51, opening 52, which is routed to correspond to the profile of print pattern of the cloth, is provided. Reference pins 54, 54' are provided under the flange portion 53 to engage into reference holes 45, 45' of foam depositing jig 40 shown in FIG. 4.

According to the first method for three-dimensionally molding a cloth, a fabric layer having one surface on which a plastic film is laminated is placed onto an elastic sheet 41 of foam depositing jig 40 shown in FIG. 4 with the plastic film upward. Preferably, the periphery of the fabric layer is radially larger than the periphery of the print pattern by about 25 mm. Next, masking jig 50 of FIG. 5 is mounted on the foam depositing jig 40, and liquid foaming mixture is deposited with a spray from above opening 52. The liquid foaming mixture is comprised of a polyurethane foam or polyurea foam which is a mixture of isocyanate (ISO), polyol (poly), other catalyst, and water. The mixture spray system is a well-known device for example the PSM80 by ISOTHERM Co. Ltd. In the mixture spray system, each of liquid raw materials is independently preheated to 60–80° C. (preferably to 70° C.) and is stirred and mixed at high pressure in the mixing head. The resulting foam atomized mixture is sprayed onto a target. The foam may also be coated on by a dispensing method. After the coating of the liquid foam mixture is completed, masking jig 50 is quickly removed from foam depositing jig 40. As a result, foam mixture layer 43 having a desired profile is formed on the fabric layer as shown in FIG. 4.

Figure 6:
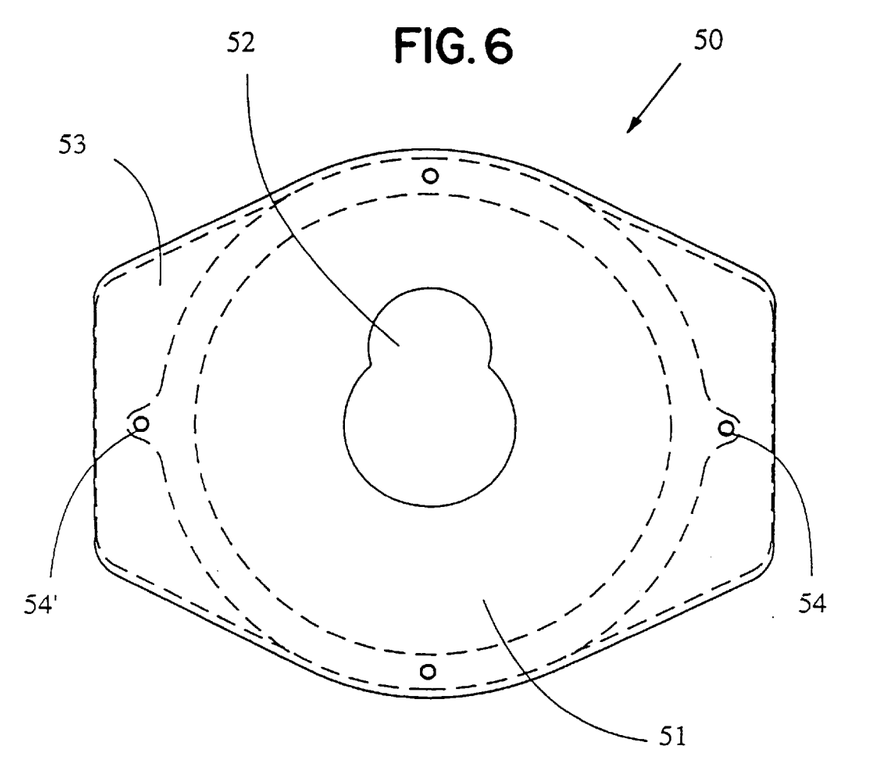
Figure 7:
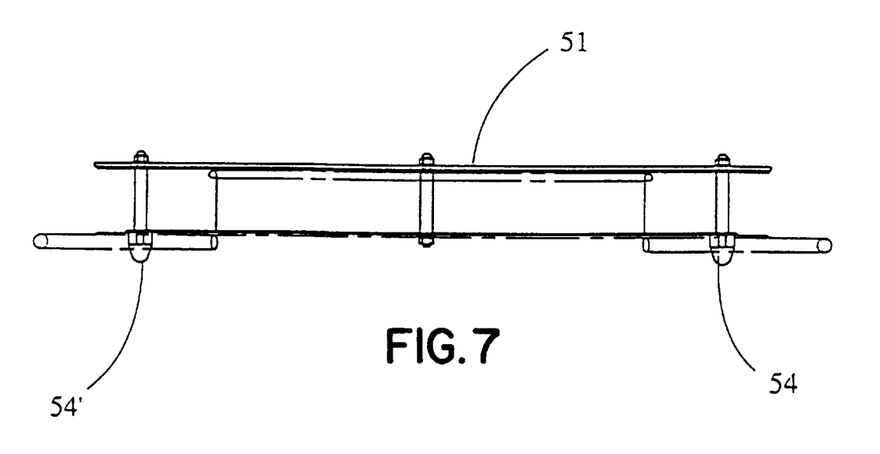
FIG. 7 is a side view of a masking jig used in the method for the three-dimensionally molding of a printed cloth according to the present invention.
Figure 8:
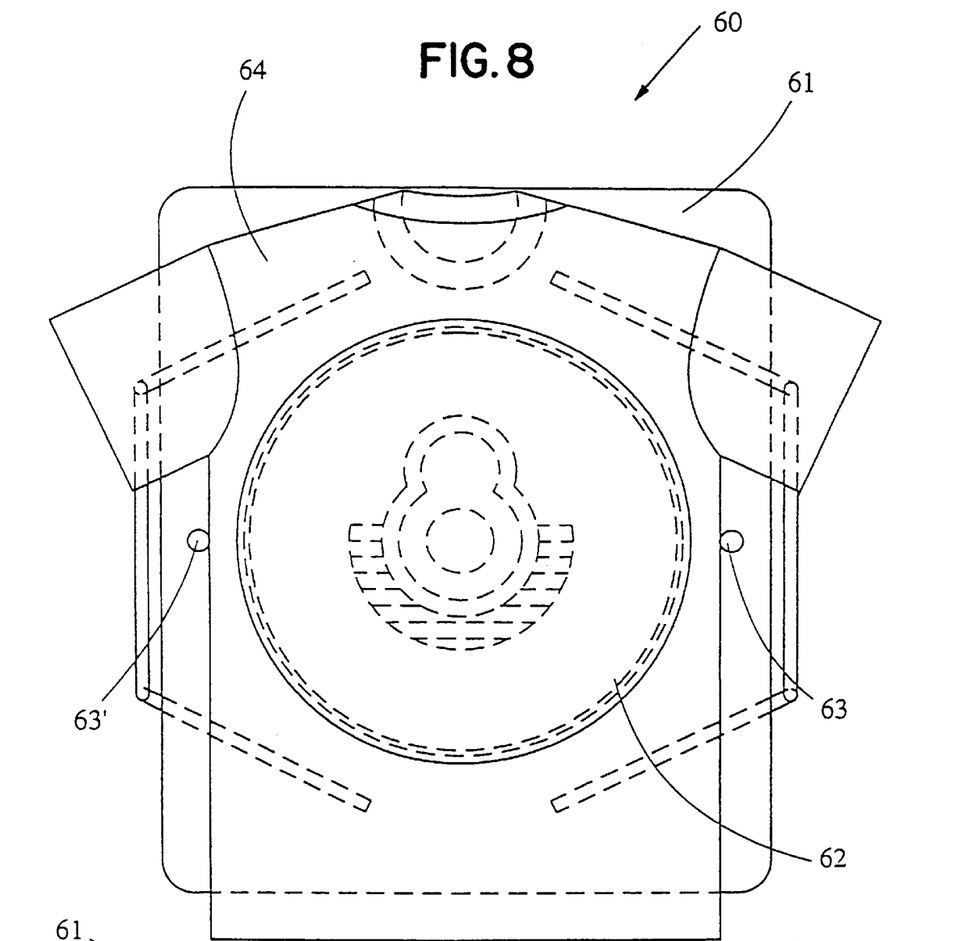
Figure 9:
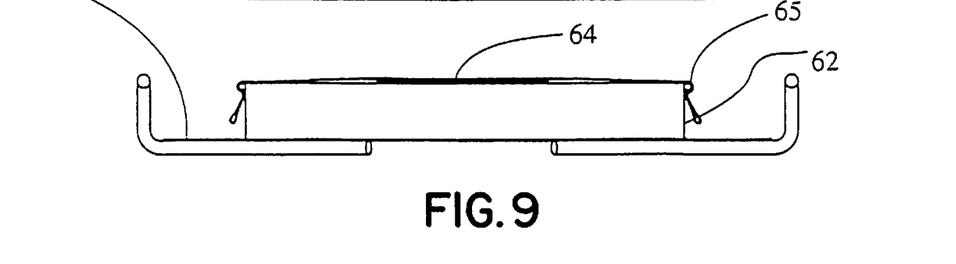
FIG. 9 is a side view of a cloth placing jig used in the method for the three-dimensionally molding of a printed cloth according to the present invention.

FIGS. 6 and 7 show respectively cloth placing jig 60 and cloth locating device 70 used in the third step of opposing a back surface of printed cloth to the fabric layer so that the print pattern profile of the cloth conforms to the profile of the liquid foaming mixture. FIGS. 8 and 9 are respectively the top and side view of cloth placing jig 60. Cloth placing jig 60 comprises cylindrical portion 62 and flange portion 61 which extends outwardly from one open end of the cylindrical portion 62. Upper open end 65 of cylindrical portion 62 is curled outward to prevent the cloth from catching on it. At least two reference holes 63, 63' are provided on flange portion 61. As shown in FIG. 6, shirt 64 which is reversed is held to curled end 65 of cylindrical portion 62 by a rubber band with the print surface upward. It should be noted that the profile of the print pattern must conform to the profile of liquid foam and shape of inner surface of lower metal mold 82 of FIG. 8. This problem is solved by cloth locating device 70 which is shown in FIG. 7.

Figure 10:
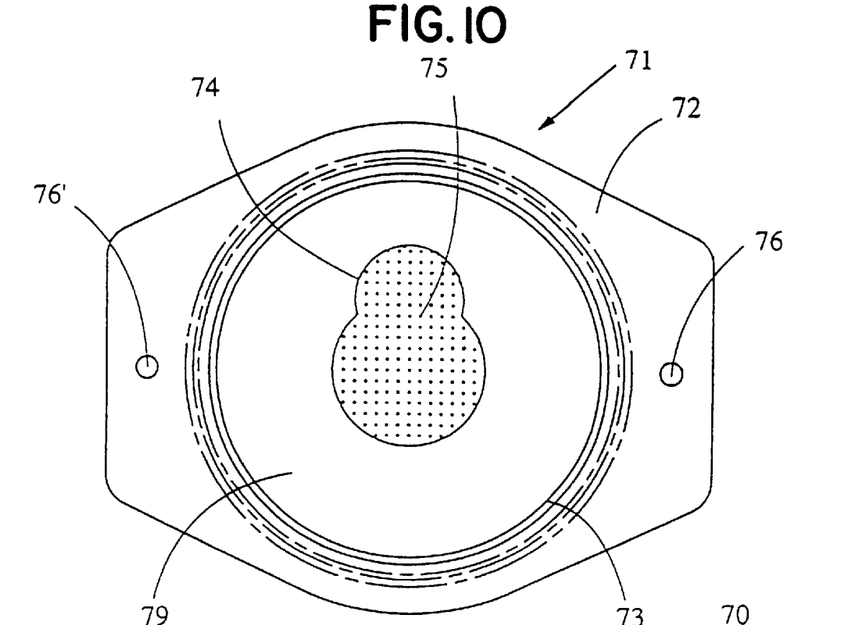
Figure 11:
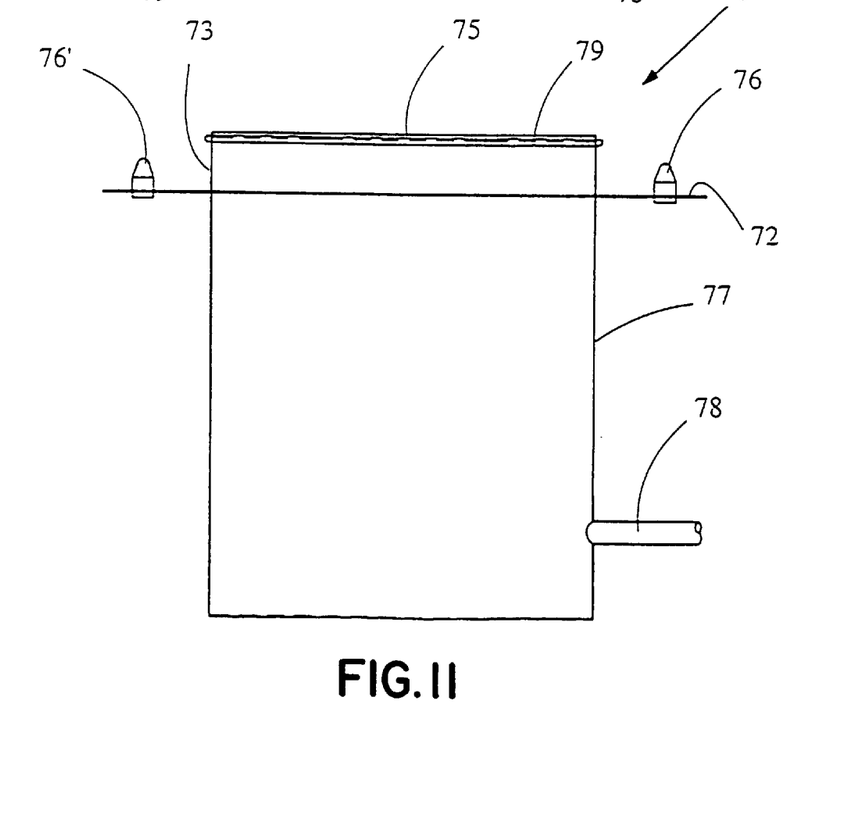
FIG. 11 is a side view of a cloth locating jig used in the method for the three-dimensionally molding of a printed cloth according to the present invention.

FIGS. 10 and 11 show respectively a top view and side view of locating device 70. Locating device 70 comprises cover 71 and chamber 77. The cover 71 comprises cylindrical portion 73 and flange portion 72. The upper end surface of the cylindrical portion 73 is sealed by polyethylene resin plate 79 having opening 74 whose profile conforms to the profile of the print pattern. A lot of vent holes 75 are provided on the inner side of opening 74. Reference pins 76, 76' are provided on the flange portion 72, so that the reference pins engage into reference holes 63, 63' of cloth placing jig 60. Exhaust pump (not shown) is connected to chamber 77 through outlet 78.

The third step of the method of the present invention, which is comprised of opposing a back surface of printed cloth to the fabric layer so that the print pattern profile of the cloth conforms to the profile of the liquid foaming mixture, is carried out specifically as follows, using the jigs and devices of FIGS. 6 and 7.

First, cloth placing jig 60 of FIG. 8 is mounted on locating device 70 of FIG. 10 so that the reference pins are inserted into the reference holes. Next, shirt 64 which is reversed is placed onto cloth placing jig 60 with the print side upward. Following this step, the exhaust pump is actuated and chamber 77 is exhausted by the pump. The print portion of the shirt, because of little air permeability, is pulled due to vent holes 75 toward opening 74. In this situation, the operator can manually adjust the position of the shirt so that the profile of print of the shirt conforms to the periphery of the opening 74, and then he can fix the shirt to curled end 65 with a rubber band to hold. Thus, both cloth placing jig 60 on which the shirt is locationally fixed in position and foam depositing jig 40 on which liquid foam is coated are mounted on lower metal mold 82 of FIG. 12 so that the back surface of the printed cloth opposes the liquid foam.

Figure 12:
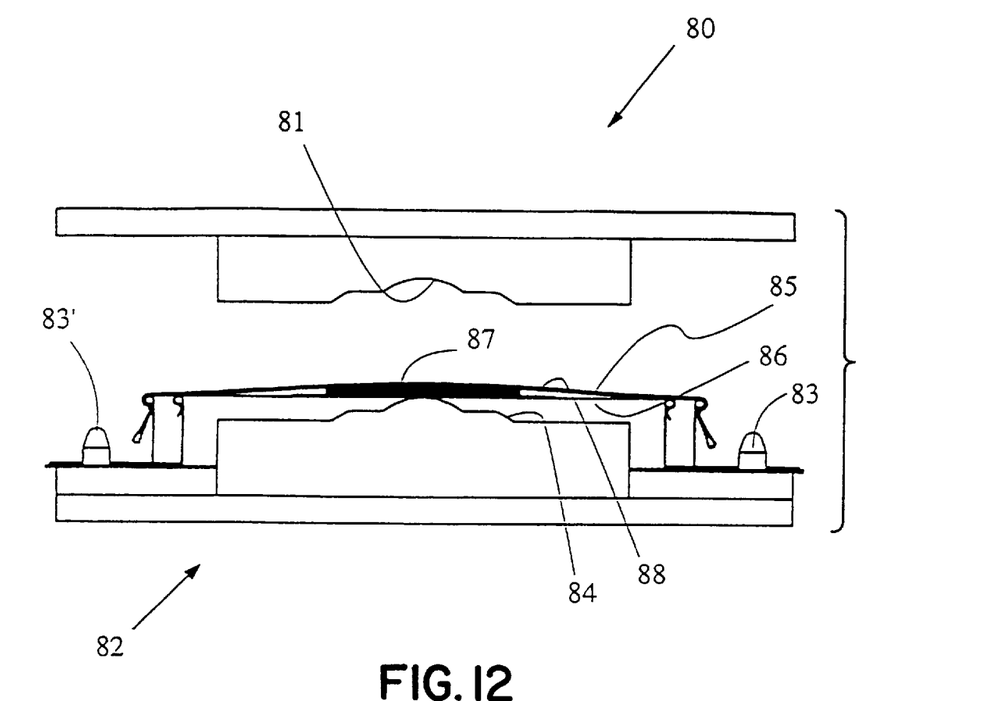
FIG. 12 shows the integral compression by both the upper metal mold and lower metal mold used in the method for the three-dimensionally molding of a printed cloth according to the present invention.

FIG. 12 shows upper metal mold 80 and lower metal mold 82 used in the fourth step of integrally pressurizingly compressing according to the present invention. Upper metal mold 80 and lower metal mold 82 are preferably made of aluminum, and concave surface 81 of the upper metal mold and convex surface 84 of the lower metal mold are respectively shaped so as to conform to the profile of the print pattern. Foam depositing jig 40 of FIG. 4 and cloth placing jig 60 of FIG. 6 are mounted onto the lower metal mold 82 in order that reference pins 83, 83' of the lower metal mold 82 engage into the reference holes of each of the jigs.

It should be noted that it is important to determine the timing when the polyurethane foam is pressurizingly compressed. As is well known in the art, the chemical reactions of the foam consist of gasification reaction and solidification reaction following it. If compression molding is implemented before the foam gasification reaction has completed, unreacted foam may soak out of the surface of the shirt. On the contrary, if compression molding is implemented after the solidification reaction has completed, there arises a problem that the foam does not adhere to the back surface of the shirt. Therefore, the compression molding must be implemented carefully and speedily between the time when the gasification reaction has finished until the time when the solidification reaction begins (generally called tack-free), that is, while the foam body is still in a viscoelastic fluid state. By experiment, it was found that the time of compression molding is when it is past 30 to 50 seconds from when the liquid foam is coated on, preferably it is when it is past 40 seconds from then. The rising height due to the expansion of the foam can be selected in the range of 5 mm to 55 mm depending on the blend of the raw materials and the quantity of the foam deposited. According to the fourth step of the present invention, elastic sheet 86, fabric 88, liquid foam 87 which is under viscoelastic fluid state, and shirt 85 are integrally pressurizingly compressed by concave surface 81 of upper metal mold 80 and convex surface 84 of lower metal mold 82.

According to the fifth step of the present invention, the integral pressurizing compression is preferably implemented by applying a force of 1256 kg (4 kg/cm2×200 mm diameter) for 30 seconds to 3 minutes. During this time, the foam transits to a solid state retaining the shape of three-dimensional print pattern which is molded by upper metal mold 80 and lower metal mold 82, and at the same time the plastic film surface of fabric 88 adheres to the back surface of the foam. The aforementioned compression time can be reduced by heating the upper metal mold and lower metal mold before compression molding. After the foam has sufficiently solidified and the plastic film surface of the fabric has adhered fully to the back surface of the foam body, shirt 85 is removed from the metal mold and is displaced onto an iron (not shown) by which the surface of the shirt is compressed and heated at about 40° C. and the back surface of the shirt is simultaneously compressed and heated at about 200° C. for about 20 seconds. Thereby, the plastic film at the peripheral edge of the fabric 88 thermally adheres to cloth portion along the circumference of the back surface of the foam body, and the entire foam is completely sealed between the back surface of the printed cloth of the shirt and the plastic film surface of the fabric.

In the second method of the present invention, a foam is coated directly onto an elastic sheet. The elastic sheet is the same as the elastic sheet 41, but silicone rubber which has better foam peelability is preferable. The second method according to the present invention for three-dimensionally molding printed cloth comprises, depositing a liquid foaming mixture onto a flat elastic sheet so as to conform to a desired profile, opposing a back surface of printed cloth to the elastic sheet so that the print pattern profile of the cloth conforms to the profile of the liquid foaming mixture, integrally pressurizingly compressing the printed cloth, the foam, and the elastic sheet by means of both an upper metal mold whose inner surface corresponds to the shape of three-dimensional surface of the print pattern and a lower metal mold whose inner surface corresponds to the shape of the three-dimensional back surface of the print pattern while the foam is still under viscoelastic fluid state after gas reactions of the foam are completed and allowing the foam to transit to solid state at the same time, locating a fabric having one surface on which a plastic film is laminated so as to substantially cover the entire back surface of compressed foam and thermally adhering periphery portion of the fabric to the cloth of peripheral region around the back surface of the foam body. The jigs and devices used in the second method are the same as those used in the first method. It is different from the first method in that only the peripheral edge portion of the fabric having one surface on which a plastic film is laminated is thermally adhered to the cloth of peripheral region around the back surface of the foam body after integral compression. The method of thermally adhering is the same as that of the first method.

Thus, by three-dimensionally printed cloth molding according to the present invention, the foam body is never directly in contact with the user's skin because it is completely sealed by a fabric having one surface on which a plastic film is laminated.

Further, the feel is not impaired because the fabric is inserted between the foam body and the skin, and sweat and moisture never seep into the foam body because they are guarded by the plastic film.

Moreover, the deterioration of the surface of the foam body by repeated laundering or by ultraviolet rays from the sun is reduced because the foam body is completely covered by the fabric, thereby the durability in normal use is improved.

On the other hand, in the method for three-dimensionally molding printed cloth according to the present invention, by using silicone rubber which has good expansion and contraction properties, good restorability, and good peelability, it is possible not only to use it as a elastic sheet repeatedly for many times, but also to deposit the foam directly onto the silicone rubber, whereby production costs can be greatly reduced and throughput can be improved as compared to conventional.

We claim:

1. A three-dimensional cloth molding shaped by compression molding to integrally form a cloth and foam comprising:
   a cloth layer having a print pattern on the surface, and molded three-dimensionally so as to conform to the profile shape of said print pattern;
   a foam body layer which is fixedly adhered to the entire back surface region of said cloth layer in the area of said print pattern and supports the three-dimensional shape of said print pattern; and,
   a fabric layer having one surface on which a plastic film is laminated, wherein after compression molding is implemented only the peripheral edge of said plastic film of said fabric layer is thermally adhered to said cloth layer around the back surface of said foam body layer so as to cover substantially the entire back surface of said foam body layer.

2. A three-dimensional cloth molding as set forth in claim 1, wherein said foam body is made of a polyurethane or polyurea foam.

3. A three-dimensional cloth molding as set forth claim 1, wherein said fabric layer consists of either woven fabric, knitted fabric, or nonwoven fabric.

4. A three-dimensional cloth molding as set forth in claim 1, wherein said plastic film is made from nylon, polyester, or polypropylene each consisting of moisture-nonpermeable thermoplastic resins, and is 10 $\mu$m to 1 mm thick.

5. A three-dimensional cloth molding shaped by compression molding to integrally form a cloth, foam and fabric comprising:
   a cloth layer having a print pattern on the front surface, and molded three-dimensionally so as to conform to the profile shape of said print pattern;
   a foam body layer which is fixedly adhered to the entire back surface region of said cloth layer in the area of said print pattern and supports the three-dimensional shape of said print pattern; and,
   a fabric layer having one surface on which a plastic film is laminated, wherein at the back surface region of said foam body layer said plastic film of said fabric layer is fixedly adhered to the entire back surface of said foam body layer so as to conform to the profile shape of said back surface of said foam body layer and at the peripheral region of said foam body layer said plastic film at the peripheral edge region of said fabric layer is thermally adhered to said cloth layer around the back surface of said foam body layer.

6. Three-dimensional cloth molding as set forth in claim 5, wherein said foam body is made of a polyurethane or polyurea foam.

7. Three-dimensional cloth molding as set forth in claim 5, wherein said fabric layer is consisting of either woven fabric, knitted fabric, or nonwoven fabric.

8. Three-dimensional cloth molding as set forth in claim 5, wherein said plastic film is made from nylon, polyester, or polypropylene each consisting of moisture-nonpermeable thermoplastic resins, and is 10 $\mu$m to 1 mm thick.

9. A method for three-dimensionally molding a printed cloth corresponding to a print pattern of the cloth surface, comprising the steps of:
   placing a fabric layer having one surface on which a plastic film is laminated onto a flat elastic sheet with said plastic film surface upward;
   depositing a liquid foaming mixture onto said fabric layer;
   opposing a back surface of the printed cloth to said fabric layer so that the print pattern profile of the cloth conforms to the profile of the liquid foaming mixture;
   compression molding the printed cloth, the foam, the fabric layer, and the elastic sheet by means of both an upper metal mold whose inner surface corresponds to the shape of a three-dimensional surface of the print pattern and a lower metal mold whose inner surface corresponds to the shape of a three-dimensional back surface of the print pattern at a time after the foam is deposited and while the foam is still in a viscoelastic fluid state; and,
   holding compression for a while to allow the foam to transit to solid state and to fixedly adhere the plastic film side of the fabric layer to the back surface of the foam.

10. A method for three-dimensionally molding a printed cloth corresponding to a print pattern of the cloth surface, as set forth in claim 9, wherein said elastic sheet is made of natural rubber or silicone rubber.

11. A method for three-dimensionally molding a printed cloth corresponding to a print pattern of the cloth surface, as set forth in claim 9, wherein liquid foaming mixture of said foam is deposited in the desired shape by means of a dispensing system or a spraying system.

12. A method for three-dimensionally molding a printed cloth corresponding to a print pattern of the cloth surface, as set forth in claim 9, comprising the further step of:
   preheating raw materials of said liquid foaming mixture to the range of 60 to 80° C. before being deposited.

13. A method for three-dimensionally molding a printed cloth corresponding to a print pattern of the cloth surface, as set forth in claim 9, wherein the time duration for holding the integral compression is 30 seconds to 3 minutes.

14. A method for three-dimensionally molding a printed cloth corresponding to a print pattern of the cloth surface, as set forth in claim 9, wherein at the step of compression molding, the time duration between deposition of said liquid foaming mixture and pressurizing compression is 30 to 50 seconds.

15. A method for three-dimensionally molding a printed cloth corresponding to a print pattern of the cloth surface, as set forth in claim 9, comprising the further step of:
   thermally adhering the peripheral edge of the fabric having one surface on which a plastic film is laminated to the cloth in the peripheral edge region around the back surface of said foam body.

16. A method for three-dimensionally molding a printed cloth corresponding to a print pattern of the cloth surface, comprising the steps of:
   depositing a liquid foaming mixture onto a flat elastic sheet;
   opposing a back surface of the printed cloth to said flat elastic sheet so that the print pattern profile of the cloth conforms to the profile of the liquid foaming mixture;
   compression molding said printed cloth, the foam, and the elastic sheet by means of both an upper metal mold whose inner surface corresponds to the shape of a three-dimensional surface of the print pattern and a lower metal mold whose inner surface corresponds to the shape of a three-dimensional back surface of the print pattern at a time after the foam is deposited and while the foam is still in a viscoelastic fluid state;

transiting the foam to solid state by retaining the desired shape which is formed by both said upper metal mold and said lower metal mold by holding compression for a time duration; and, thermally adhering the peripheral edge of the fabric having one surface on which a plastic film is laminated to the cloth of the peripheral region around the back surface of said foam body so that said fabric substantially covers the entire back surface of said foam body.

17. A method for three-dimensionally molding a printed cloth corresponding to a print pattern of the cloth surface, as set forth in claim 16, wherein said elastic sheet is made of natural rubber or silicone rubber.

18. A method for three-dimensionally molding a printed cloth corresponding to a print pattern of the cloth surface, as set forth in claim 16, wherein liquid foaming mixture of said foam is deposited in the desired shape by means of a dispensing system or a spraying system.

19. A method for three-dimensionally molding a printed cloth corresponding to a print pattern of the cloth surface, as set forth in claim 16, comprising the further step of:

preheating raw materials of said liquid foaming mixture to the range of 60 to 80° C. before it is deposited.

20. A method for three-dimensionally molding a printed cloth corresponding to a print pattern of the cloth surface, as set forth in claim 7, wherein at the compression molding, the predetermined time duration between deposition of said liquid foaming mixture and pressurizing compression is 30 to 50 seconds.

21. A method for three-dimensionally molding a printed cloth corresponding to a print pattern of the cloth surface, as set forth in claim 16, wherein the predetermined time duration for holding the integral compression is 30 seconds to 3 minutes.

22. A three-dimensional cloth molding comprising, a cloth layer having a front surface with a print pattern thereon and a back surface, said cloth layer having a three-dimensional portion associated with said print pattern, a foam layer having a front surface adhered to said back surface of said cloth layer in the area of said print pattern and providing a three-dimensional support to which said cloth layer conforms, and a fabric layer having a plastic film laminated on a front surface thereof, said plastic film covering said foam layer and having a peripheral edge thermally adhered to said back surface of said cloth layer, whereby said foam layer is fully enclosed between said cloth layer and said fabric layer.

23. A three-dimensional cloth molding according to claim 22, wherein said plastic film of said fabric layer is adhered to said foam layer.

* * * * *

UNITED STATES PATENT AND TRADEMARK OFFICE
CERTIFICATE OF CORRECTION

PATENT NO.    : 6,066,391  
DATED         : May 23, 2000  
INVENTOR(S)   : Taro Ogawa, Fumio Goto Page 1 of 1

It is certified that error appears in the above-identified patent and that said Letters Patent is hereby corrected as shown below:

Column 10, claim 12,
Line 5, "C." should read -- C --.

Column 11, claim 19,
Line 5, "C." should read -- C --.

Column 12, claim 20,
Line 3, "7" should read -- 16 --.

Signed and Sealed this

Nineteenth Day of March, 2002

Attest:

Attesting Officer

JAMES E. ROGAN
Director of the United States Patent and Trademark Office